(12) United States Patent
Reynolds et al.

(10) Patent No.: US 8,064,515 B2
(45) Date of Patent: *Nov. 22, 2011

(54) SYSTEM AND METHOD FOR COMPRESSING PORTIONS OF A MEDIA SIGNAL USING DIFFERENT CODECS

(75) Inventors: Jodie L. Reynolds, Folsom, CA (US); Robert W. Ingraham, Folsom, CA (US); Lawrence S. Reznick, Sacramento, CA (US); John E. Wilkinson, Carmichael, CA (US); Jack A. Prock, Folsom, CA (US); Danny L. Mabey, Farmington, UT (US)

(73) Assignee: Interact Devices, Inc., Folsom, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/544,102

(22) Filed: Aug. 19, 2009

(65) Prior Publication Data

US 2009/0310671 A1    Dec. 17, 2009

Related U.S. Application Data

(63) Continuation of application No. 10/692,106, filed on Oct. 23, 2003, now Pat. No. 7,599,434, which is a continuation-in-part of application No. 10/256,866, filed on Sep. 26, 2002, now Pat. No. 7,295,608.

(60) Provisional application No. 60/325,483, filed on Sep. 26, 2001.

(51) Int. Cl.
*H04N 7/12* (2006.01)

(52) U.S. Cl. .............................. 375/240.01; 375/240.12

(58) Field of Classification Search .................. 375/240, 375/240.01, 240.12
See application file for complete search history.

(56) References Cited

U.S. PATENT DOCUMENTS

| 5,481,297 A | 1/1996 | Cash et al. |
|---|---|---|
| 5,517,246 A | 5/1996 | Suzuki |
| 5,539,908 A | 7/1996 | Chen et al. |
| 5,596,659 A | 1/1997 | Normile et al. |
| 5,649,030 A | 7/1997 | Normile et al. |
| 5,684,714 A | 11/1997 | Yogeshwar et al. |

(Continued)

FOREIGN PATENT DOCUMENTS

EP    0889471 B1    6/2004

(Continued)

OTHER PUBLICATIONS

Notice of Allowance mailed Oct. 10, 2007, for U.S. Appl. No. 10/784,397, filed Feb. 23, 2004.

(Continued)

*Primary Examiner* — Allen Wong
(74) *Attorney, Agent, or Firm* — Kory D. Christensen; Stoel Rives LLP

(57) ABSTRACT

An input module obtains a media signal to be communicated to a destination system, after which an identification module identifies a plurality of scenes within the media signal. A selection module automatically selects different codecs from a codec library to respectively compress at least two of the scenes. The codecs are automatically selected to produce a highest compression quality for the respective scenes according to a set of criteria without exceeding a target data rate. A compression module then compresses the scenes using the automatically selected codecs, after which an output module delivers the compressed scenes to the destination system with an indication of which codec was used to compress each scene.

18 Claims, 11 Drawing Sheets

U.S. PATENT DOCUMENTS

| | | | |
|---|---|---|---|
| 5,822,465 | A | 10/1998 | Normile et al. |
| 6,002,720 | A | 12/1999 | Yurt et al. |
| 6,031,939 | A | 2/2000 | Gilbert et al. |
| 6,085,236 | A | 7/2000 | Lea |
| 6,115,755 | A | 9/2000 | Krishan |
| 6,157,965 | A | 12/2000 | Mohammed et al. |
| 6,195,692 | B1 | 2/2001 | Hsu |
| 6,212,302 | B1 | 4/2001 | Honsinger et al. |
| 6,243,676 | B1 | 6/2001 | Witteman |
| 6,252,544 | B1 | 6/2001 | Hoffberg |
| 6,349,151 | B1 | 2/2002 | Jones et al. |
| 6,356,545 | B1 | 3/2002 | Vargo et al. |
| 6,356,589 | B1 | 3/2002 | Gebler et al. |
| 6,356,668 | B1 | 3/2002 | Honsinger et al. |
| 6,421,726 | B1 | 7/2002 | Kenner et al. |
| 6,587,638 | B1 | 7/2003 | Watanabe et al. |
| 6,624,761 | B2 | 9/2003 | Fallon |
| 6,754,181 | B1 | 6/2004 | Elliott et al. |
| 6,968,006 | B1 | 11/2005 | Puri et al. |
| 7,130,472 | B2 | 10/2006 | Lizuka et al. |
| 2002/0062482 | A1 | 5/2002 | Bolle et al. |
| 2002/0097917 | A1 | 7/2002 | Nelson et al. |
| 2003/0133501 | A1 | 7/2003 | Ueda et al. |

FOREIGN PATENT DOCUMENTS

| | | |
|---|---|---|
| WO | 9918728 A1 | 4/1999 |
| WO | 02087255 A1 | 10/2002 |

OTHER PUBLICATIONS

U.S. Appl. No. 10/784,754, filed Feb. 23, 2004.
U.S. Appl. No. 10/825,711, filed Apr. 16, 2004.
U.S. Appl. No. 11/518,298, filed Sep. 8, 2006.
U.S. Appl. No. 11/937,983, filed Nov. 9, 2007.
U.S. Appl. No. 11/945,131, filed Nov. 26, 2007.
Office Action mailed May 23, 2008, for U.S. Appl. No. 10/825,711, filed Apr. 16, 2004.
Office Action mailed May 28, 2008, for U.S. Appl. No. 10/784,754, filed Feb. 23, 2004.
Office Action mailed Jun. 21, 2007, for U.S. Appl. No. 10/784,397, filed Feb. 23, 2004.
Notice of Allowance mailed Aug. 21, 2007, for U.S. Appl. No. 10/256,866, filed Sep. 26, 2002.
Office Action mailed Mar. 26, 2007, for U.S. Appl. No. 10/256,866, filed Sep. 26, 2002.
Office Action mailed Sep. 27, 2006, for U.S. Appl. No. 10/256,866, filed Sep. 26, 2002.
Notice of Allowance mailed Oct. 1, 2008, for U.S. Appl. No. 10/784,754, filed Feb. 23, 2004.
Ostman, Charles; Sentence on Demand; as an Online Commodity; 1997, 1998; www.biota.org/ostman/sent1.htm; pp. 1-11.

SYSTEM AND METHOD FOR COMPRESSING PORTIONS OF A MEDIA SIGNAL USING DIFFERENT CODECS

CROSS-REFERENCE TO RELATED APPLICATIONS

This application is a continuation of U.S. patent application Ser. No. 10/692,106, filed Oct. 23, 2003, now U.S. Pat. No. 7,599,434, issued Oct. 6, 2009, which is a continuation-in-part of U.S. patent application Ser. No. 10/256,866, filed Sep. 26, 2002, now U.S. Pat. No. 7,295,608, issued Nov. 13, 2007, which claims the benefit of Provisional Application No. 60/325,483, filed Sep. 26, 2001. All of the foregoing applications are incorporated herein by reference.

TECHNICAL FIELD

The present invention relates generally to the field of data compression. More specifically, the present invention relates to techniques for optimizing the compression of video and audio signals.

BACKGROUND OF THE INVENTION

In the communication age, bandwidth is money. Video and audio signals (hereinafter "media signals") consume enormous amounts of bandwidth depending on the desired transmission quality. As a result, data compression is playing an increasingly important role in communication.

Conventionally, the parties to a communication decide on a particular codec (compressor/decompressor) for compressing and decompressing media signals. A wide variety of codecs are available. General classifications of codecs include discrete cosine transfer (DCT) or "block" codecs, fractal codecs, and wavelet codecs.

Some codecs are "lossless", meaning that no data is lost during the compression process. A compressed media signal, after being received and decompressed by a lossless codec, is identical to the original. However, most commercially-available codecs are "lossy" and result in some degradation of the original media signal.

For lossy codecs, compression "quality" (i.e., how similar a compressed media signal is to the original after decompression) varies substantially from codec to codec, and may depend, for instance, on the amount of available bandwidth, the quality of the communication line, characteristics of the media signal, etc. Another compression metric, i.e., performance, relates to the amount of bandwidth required to transmit the compressed signal as opposed to the original signal. Typically, lossy codecs result in better performance than lossless codecs, which is why they are preferred in most applications.

Codec designers generally attempt to fashion codecs that produce high quality compressed output across a wide range of operating parameters. Although some codecs, such as MPEG-2, have gained widespread acceptance because of their general usefulness, no codec is ideally suited to all purposes. Each codec has individual strengths and weaknesses.

Conventionally, the same codec is used to compress and decompress a media signal during the entire communication session or uniformly across a storage medium (e.g., DVD). However, a media signal is not a static quantity. A video signal, for example, may change substantially from scene to scene. Likewise, the available bandwidth or line quality may change during the course of a communication. Selecting the wrong codec at the outset can be a costly mistake in terms of the bandwidth required to transmit or store the media signal.

DETAILED DESCRIPTION

Figure 1:
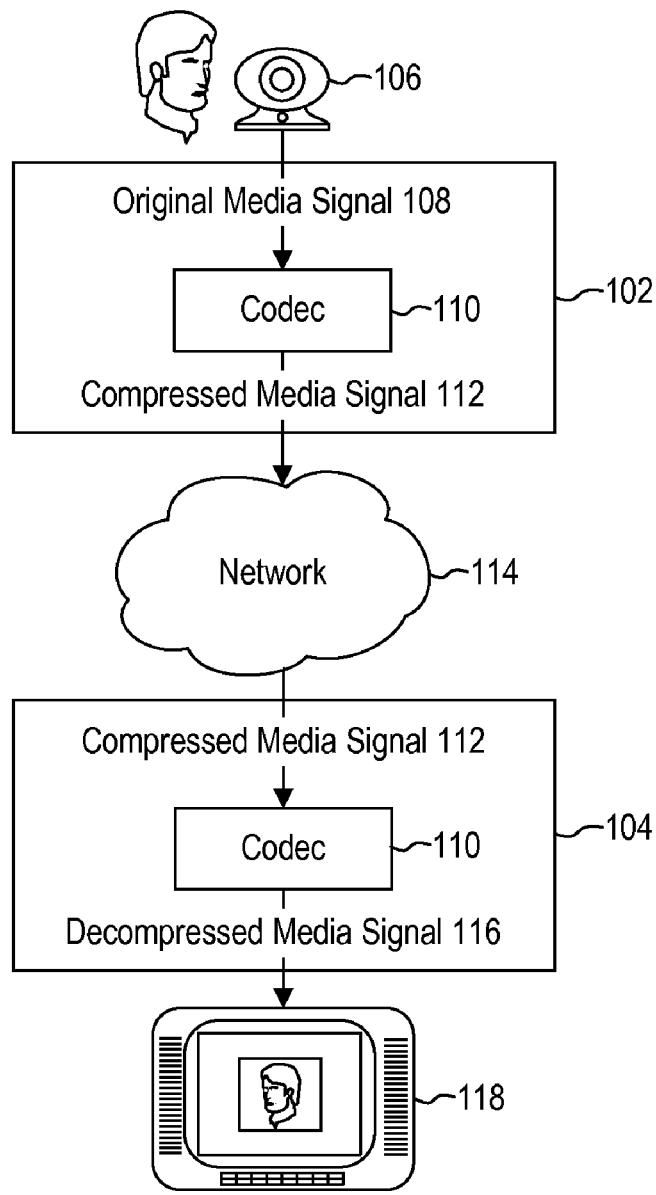
FIG. 1 is a block diagram of a conventional communication system using data compression.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a block diagram of a conventional system 100 for communicating media signals from a source system 102 to a destination system 104. The source and destination systems 102, 104 may be variously embodied, for example, as personal computers (PCs), cable or satellite set-top boxes (STBs), or video-enabled portable devices, such as personal digital assistants (PDAs) or cellular telephones.

Within the source system 102, a video camera 106 or other device captures an original media signal 108. A codec (compressor/decompressor) 110 processes the original media signal 108 to create a compressed media signal 112, which may be delivered to the destination system 104 via a network 114, such as a local area network (LAN) or the Internet. Alternatively, the compressed media signal 112 could be written to a storage medium, such as a CD, DVD, flash memory device, or the like.

At the destination system 104, the same codec 110 processes the compressed media signal 112 received through the network 114 to generate a decompressed media signal 116.

The destination system 104 then presents the decompressed media signal 116 on a display device 118, such as a television or computer monitor.

Conventionally, the source system 102 uses a single codec 110 to process the entire media signal 108 during a communication session or for a particular storage medium. However, as noted above, a media signal is not a static quantity. Video signals may change substantially from scene to scene. A single codec, which may function well under certain conditions, may not fare so well under different conditions. Changes in available bandwidth, line conditions, or characteristics of the media signal, itself, may drastically change the compression quality to the point that a different codec may do much better. In certain cases, a content developer may be able to manually specify a change of codec 110 within a media signal 108 where, for instance, the content developer knows that one codec 110 may be superior to another codec 110. However, this requires significant human effort and cannot be performed in real time.

Figure 2:
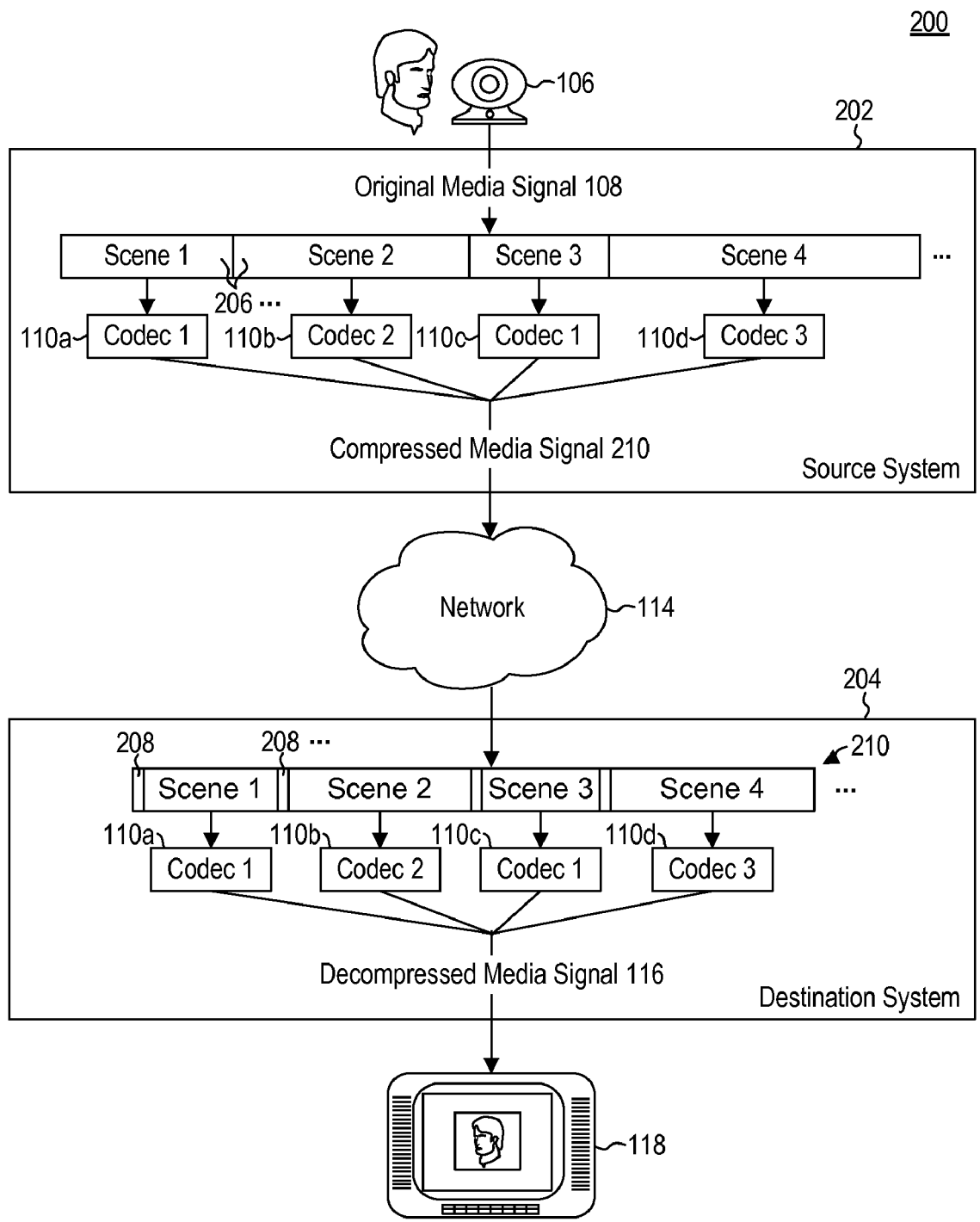
FIG. 2 is a block diagram of a communication system using multiple codecs for compressing portions of a media signal according to an embodiment of the invention.

FIG. 2 is a block diagram of an alternative system 200 for communicating media signals from a source system 202 to a destination system 204 according to an embodiment of the present invention. As before, the source system 202 receives an original media signal 108 captured by a video camera 106 or other suitable device.

However, unlike the system 100 of FIG. 1, the depicted system 200 is not limited to using a single codec 110 during a communication session or for a particular storage medium. Rather, as described in greater detail below, each scene 206 or segment of the original media signal 108 may be compressed using one of a plurality of codecs 110. A scene 206 may include one or more frames of the original media signal 108. In the case of video signals, a frame refers to a single image in a sequence of images. More generally, however, a frame refers to a packet of information used for communication.

As used herein, a scene 206 may correspond to a fixed segment of the media signal 108, e.g., two seconds of audio/video or a fixed number of frames. In other embodiments, however, a scene 206 may be defined by characteristics of the original media signal 108, i.e., a scene 206 may include two or more frames sharing similar characteristics. When one or more characteristics of the original media signal 108 changes beyond a preset threshold, the source system 202 may detect the beginning of a new scene 206. Thus, while the video camera 106 focuses on a static object, a scene 206 may last until the camera 106, the object, or both are moved.

As illustrated, two adjacent scenes 206 within the same media signal 108 may be compressed using different codecs 110. The codecs 110 may be of the same general type, e.g., discrete cosine transform (DCT), or of different types. For example, one codec 110a may be a DCT codec, while another codec 110b is a fractal codec, and yet another codec 110c is a wavelet codec.

Unlike conventional systems 100, the system 200 of FIG. 2 automatically selects, from the available codecs 110, a particular codec 110 best suited to compressing each scene 206. Details of the selection process are described in greater detail below. Briefly, however, the system 200 "remembers" which codecs 110 are used for scenes 206 having particular characteristics. If a subsequent scene 206 is determined to have the same characteristics, the same codec 110 is used. However, if a scene 206 is found to have substantially different characteristics from those previously observed, the system 200 tests various codecs 110 on the scene 206 and selects the codec 110 producing the highest compression quality (i.e., how similar the compressed media signal 210 is to the original signal 108 after decompression) for a particular target data rate.

In addition, the source system 202 reports to the destination system 204 which codec 110 was used to compress each scene 206. As illustrated, this may be accomplished by associating codec identifiers 208 with each scene 206 in the resulting compressed media signal 210. The codec identifiers 208 may precede each scene 206, as shown, or could be sent as a block at some point during the transmission. The precise format of the codec identifiers 208 is not crucial to the invention and may be implemented using standard data structures known to those of skill in the art.

The destination system 204 uses the codec identifiers 208 to select the appropriate codecs 110 for decompressing the respective scenes 206. The resulting decompressed media signal 116 may then be presented on the display device 118, as previously described.

Figure 3:
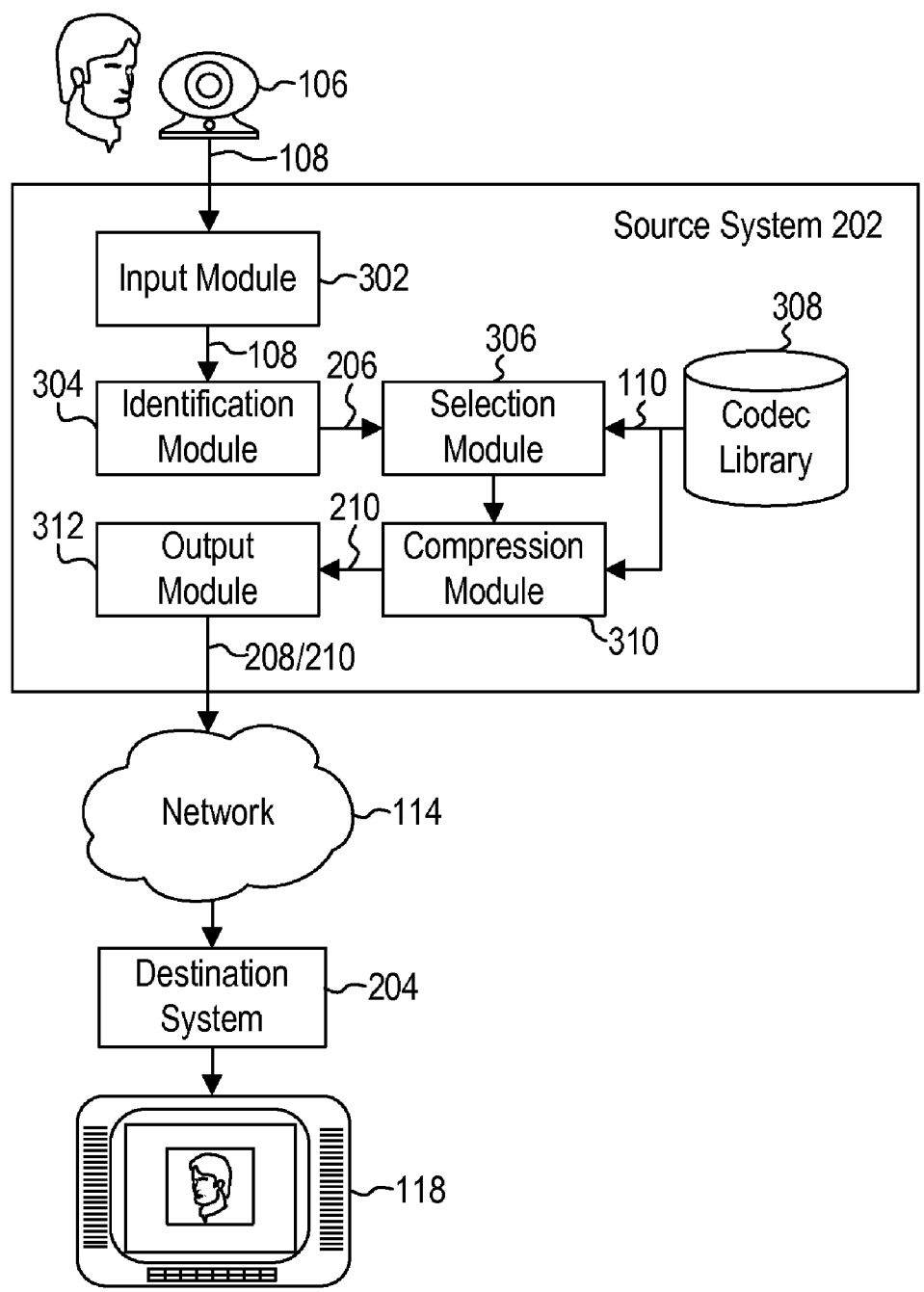
FIG. 3 is a detailed block diagram of a source system according to a first embodiment of the invention.

FIG. 3 illustrates additional details of the source system 202. In one embodiment, an input module 302 receives the original media signal 108 from the video camera 106 or other source device. An identification module 304 divides the original media signal 108 into scenes 206 and identifies various characteristics (not shown) of each scene 206, as described in greater detail below.

Thereafter, for each scene 206, a selection module 306 uses the characteristics (or the scene 206 itself) to select the optimal codec 110 from a codec library 308. As used herein, "optimal" means producing the highest compression quality for the compressed media signal 210 at a particular target data rate (among those codecs 110 within the codec library 308).

In one embodiment, a user may specify a particular target data rate, i.e., 128 kilobits per second (kbps). Alternatively, the target data rate may be determined by the available bandwidth or in light of other constraints.

The codec library 308 may include a wide variety of codecs 110. Examples of possible video codecs 110 are provided in the following table. In addition, various audio-only codecs may be provided, such as MPEG Audio Layer 3 (MP3), MPEG-4 Structured Audio (MP4-SA), CCITT u-Law, Ogg Vorbis, and AC3. Of course, other presently-available or yet-to-be-developed codecs 110 may be used within the scope of the invention.

TABLE 1

| FOURCC | Name | Owner | FOURCC | Name | Owner |
|---|---|---|---|---|---|
| 3IV1 | 3ivx | 3IVX | MPG4 | MPEG-4 | Microsoft |
| 3IV2 | 3ivx | 3IVX | MPGI | MPEG | Sigma Designs |
| AASC | Autodesk Animator codec | Autodesk | MRCA | Mrcodec | FAST Multimedia |
| ADV1 | WaveCodec | Loronix | MRLE | Microsoft RLE | Microsoft |
| ADVJ | Avid M-JPEG | Avid Technology | MSVC | Microsoft Video 1 | Microsoft |
| AEMI | Array VideoONE MPEG1-I Capture | Array Microsystems | MSZH | AVImszh | Kenji Oshima |

TABLE 1-continued

| FOURCC | Name | Owner | FOURCC | Name | Owner |
|---|---|---|---|---|---|
| AFLI | Autodesk Animator codec | Autodesk | MTX1 through MTX9 | | Matrox |
| AFLC | Autodesk Animator codec | Autodesk | MV12 | | |
| AMPG | Array VideoONE MPEG | Array Microsystems | MWV1 | Aware Motion Wavelets | Aware Inc. |
| ANIM | RDX | Intel | nAVI | | |
| AP41 | AngelPotion Definitive | AngelPotion | NTN1 | Video Compression 1 | Nogatech |
| ASV1 | Asus Video | Asus | NVDS | NVidia Texture Format | NVidia |
| ASV2 | Asus Video (2) | Asus | NVHS | NVidia Texture Format | NVidia |
| ASVX | Asus Video 2.0 | Asus | NHVU | NVidia Texture Format | NVidia |
| AUR2 | Aura 2 Codec-YUV 422 | Auravision | NVS0-NVS5 | | NVidia |
| AURA | Aura 1 Codec-YUV 411 | Auravision | NVT0-NVT5 | | NVidia |
| AVRn | Avid M-JPEG | Avid Technology | PDVC | DVC codec | I-O Data Device, Inc. |
| BINK | Bink Video | RAD Game Tools | PGVV | Radius Video Vision | Radius |
| BT20 | Prosumer Video | Conexant | PHMO | Photomotion | IBM |
| BTCV | Composite Video Codec | Conexant | PIM1 | | Pegasus Imaging |
| BW10 | Broadway MPEG Capture/Compression | Data Translation | PIM2 | | Pegasus Imaging |
| CC12 | YUV12 Codec | Intel | PIMJ | Lossless JPEG | Pegasus Imaging |
| CDVC | Canopus DV Codec | Canopus | PIXL | Video XL | Pinnacle Systems |
| CFCC | DPS Perception | Digital Processing Systems | PVEZ | PowerEZ | Horizons Technology |
| CGDI | Camcorder Video | Microsoft | PVMM | PacketVideo Corporation MPEG-4 | PacketVideo Corporation |
| CHAM | Caviara Champagne | Winnov | PVW2 | Pegasus Wavelet Compression | Pegasus Imaging |
| CMYK | Uncompressed CMYK | Colorgraph | qpeq | QPEG 1.1 | Q-Team |
| CJPG | WebCam JPEG | Creative Labs | QPEG | QPEG | Q-Team |
| CPLA | YUV 4:2:0 | Weitek | raw | Raw RGB | |
| CRAM | Microsoft Video 1 | Microsoft | RGBT | 32 bit support | Computer Concepts |
| CVID | Cinepak | Providenza & Boekelheide | RLE | Run Length Encoder | Microsoft |
| CWLT | Color WLT DIB | Microsoft | RLE4 | 4bpp Run Length Encoder | Microsoft |
| CYUV | Creative YUV | Creative Labs | RLE8 | 8bpp Run Length Encoder | Microsoft |
| CYUY | | ATI Technologies | RMP4 | MPEG-4 AS Profile Codec | Sigma Designs |
| D261 | H.261 | DEC | RT21 | Real Time Video 2.1 | Intel |
| D263 | H.263 | DEC | rv20 | RealVideo G2 | Real |
| DIV3 | DivX MPEG-4 | DivX | rv30 | RealVideo 8 | Real |
| DIV4 | DivX MPEG-4 | DivX | RVX | RDX | Intel |
| DIV5 | DivX MPEG-4 | DivX | s422 | VideoCap C210 YUV Codec | Tekram International |
| DIVX | DivX | OpenDivX | SAN3 | DivX 3 | |
| divx | DivX | | SDCC | Digital Camera Codec | Sun Communications |
| DMB1 | Rainbow Runner hardware compression | Matrox | SEDG | Samsung MPEG-4 | Samsung |
| DMB2 | Rainbow Runner hardware compression | Matrox | SFMC | Surface Fitting Method | CrystalNet |
| DSVD | DV Codec | | SMSC | Proprietary codec | Radius |

TABLE 1-continued

| FOURCC | Name | Owner | FOURCC | Name | Owner |
|---|---|---|---|---|---|
| DUCK | TrueMotion S | Duck Corporation | SMSD | Proprietary codec | Radius |
| dv25 | DVCPRO | Matrox | smsv | Wavelet Video | WorldConnect (corporate site) |
| dv50 | DVCPRO50 | Matrox | SP54 | | SunPlus |
| dvsd | | Pinnacle Systems | SPIG | Spigot | Radius |
| DVE2 | DVE-2 Videoconferencing Codec | InSoft | SQZ2 | VXTreme Video Codec V2 | Microsoft |
| DVX1 | DVX1000SP Video Decoder | Lucent | SV10 | Video R1 | Sorenson Media |
| DVX2 | DVX2000S Video Decoder | Lucent | STVA | ST CMOS Imager Data | ST Microelectronics |
| DVX3 | DVX3000S Video Decoder | Lucent | STVB | ST CMOS Imager Data | ST Microelectronics |
| DX50 | DivX MPEG-4 version 5 | DivX | STVC | ST CMOS Imager Data (Bunched) | ST Microelectronics |
| DXTn | DirectX Compressed Texture | Microsoft | STVX | ST CMOS Imager Data | ST Microelectronics |
| DXTC | DirectX Texture Compression | Microsoft | STVY | ST CMOS Imager Data | ST Microelectronics |
| ELK0 | Elsa Quick Codec | Elsa | SVQ1 | Sorenson Video | Sorenson Media |
| EKQ0 | Elsa Quick Codec | Elsa | TLMS | Motion Intraframe Codec | TeraLogic |
| ESCP | Escape | Eidos Technologies | TLST | Motion Intraframe Codec | TeraLogic |
| ETV1 | eTreppid Video Codec | eTreppid Technologies | TM20 | TrueMotion 2.0 | Duck Corporation |
| ETV2 | eTreppid Video Codec | eTreppid Technologies | TM2X | TrueMotion 2X | Duck Corporation |
| ETVC | eTreppid Video Codec | eTreppid Technologies | TMIC | Motion Intraframe Codec | TeraLogic |
| FLJP | Field Encoded Motion JPEG | D-Vision | TMOT | TrueMotion S | Horizons Technology |
| FRWA | Forward Motion JPEG with alpha channel | SoftLab-Nsk | TR20 | TrueMotion RT 2.0 | Duck Corporation |
| FRWD | Forward Motion JPEG | SoftLab-Nsk | TSCC | TechSmith Screen Capture Codec | Techsmith Corp. |
| FVF1 | Fractal Video Frame | Iterated Systems | TV10 | Tecomac Low-Bit Rate Codec | Tecomac, Inc. |
| GLZW | Motion LZW | gabest@freemail.hu | TVJP | | Pinnacle/Truevision |
| GPEG | Motion JPEG | gabest@freemail.hu | TVMJ | | Pinnacle/Truevision |
| GWLT | Greyscale WLT DIB | Microsoft | TY2C | Trident Decompression | Trident Microsystems |
| H260 through H269 | ITU H.26n | Intel | TY2N | | Trident Microsystems |
| HFYU | Huffman Lossless Codec | | TY0N | | Trident Microsystems |
| HMCR | Rendition Motion Compensation Format | Rendition | UCOD | ClearVideo | eMajix.com |
| HMRR | Rendition Motion Compensation Format | Rendition | ULTI | Ultimotion | IBM Corp. |
| i263 | ITU H.263 | Intel | V261 | Lucent VX2000S | Lucent |
| IAN | Indeo 4 Codec | Intel | V655 | YUV 4:2:2 | Vitec Multimedia |
| ICLB | CellB Videoconferencing Codec | InSoft | VCR1 | ATI Video Codec 1 | ATI Technologies |
| IGOR | Power DVD | | VCR2 | ATI Video Codec 2 | ATI Technologies |
| IJPG | Intergraph JPEG | Intergraph | VCR3-9 | ATI Video Codecs | ATI Technologies |
| ILVC | Layered Video | Intel | VDCT | VideoMaker Pro DIB | Vitec Multimedia |
| ILVR | ITU H.263+ Codec | | VDOM | VDOWave | VDONet |
| IPDV | Giga AVI DV Codec | I-O Data Device, Inc. | VDOW | VDOLive | VDONet |

TABLE 1-continued

| FOURCC | Name | Owner | FOURCC | Name | Owner |
|---|---|---|---|---|---|
| IR21 | Indeo 2.1 | Intel | VDTZ | VideoTizer YUV Codec | Darim Vision Co. |
| IRAW | Intel Uncompressed UYUV | Intel | VGPX | VideoGramPix | Alaris |
| IV30 through IV39 | Indeo 3 | Ligos | VIFP | VFAPI Codec | |
| IV32 | Indeo 3.2 | Ligos | VIDS | | Vitec Multimedia |
| IV40 through IV49 | Indeo Interactive | Ligos | VIVO | Vivo H.263 | Vivo Software |
| IV50 | Indeo Interactive | Ligos | VIXL | Video XL | Pinnacle Systems |
| JBYR | | Kensington | VLV1 | | VideoLogic |
| JPEG | JPEG Still Image | Microsoft | VP30 | VP3 | On2 |
| JPGL | JPEG Light | | VP31 | VP3 | On2 |
| L261 | Lead H.26 | Lead Technologies | vssv | VSS Video | Vanguard Software Solutions |
| L263 | Lead H.263 | Lead Technologies | VX1K | VX1000S Video Codec | Lucent |
| LCMW | Motion CMW Codec | Lead Technologies | VX2K | VX2000S Video Codec | Lucent |
| LEAD | LEAD Video Codec | Lead Technologies | VXSP | VX1000SP Video Codec | Lucent |
| LGRY | Grayscale Image | Lead Technologies | VYU9 | ATI YUV | ATI Technologies |
| Ljpg | LEAD MJPEG Codec | Lead Technologies | VYUY | ATI YUV | ATI Technologies |
| LZO1 | Lempel-Ziv-Oberhumer Codec | Markus Oberhumer | WBVC | W9960 | Winbond Electronics |
| M263 | H.263 | Microsoft | WHAM | Microsoft Video 1 | Microsoft |
| M261 | H.261 | Microsoft | WINX | Winnov Software Compression | Winnov |
| M452 | MPEG-4 (automatic WMP download) | Microsoft | WJPG | Winbond JPEG | |
| MC12 | Motion Compensation Format | ATI Technologies | WNV1 | Winnov Hardware Compression | Winnov |
| MCAM | Motion Compensation Format | ATI Technologies | x263 | | Xirlink |
| MJ2C | Motion JPEG 2000 | Morgan Multimedia | XVID | XVID MPEG-4 | XVID |
| mJPG | Motion JPEG including Huffman Tables | IBM | XLV0 | XL Video Decoder | NetXL Inc. |
| MJPG | Motion JPEG | | XMPG | XING MPEG | XING Corporation |
| MMES | MPEG-2 ES | Matrox | XWV0-XWV9 | XiWave Video Codec | XiWave |
| MP2A | Eval download | Media Excel | XXAN | | Origin |
| MP2T | Eval download | Media Excel | Y411 | YUV 4:1:1 | Microsoft |
| MP2V | Eval download | Media Excel | Y41P | Brooktree YUV 4:1:1 | Conexant |
| MP42 | MPEG-4 (automatic WMP download) | Microsoft | Y8 | Grayscale video | |
| MP43 | MPEG-4 (automatic WMP download) | Microsoft | YC12 | YUV 12 codec | Intel |
| MP4A | Eval download | Media Excel | YUV8 | Caviar YUV8 | Winnov |
| MP4S | MPEG-4 (automatic WMP download) | Microsoft | YUY2 | Raw, uncompressed YUV 4:2:2 | Microsoft |
| MP4T | Eval download | Media Excel | YUYV | | Canopus |
| MP4V | Eval download | Media Excel | ZLIB | | |
| MPEG | MPEG | | ZPEG | Video Zipper | Metheus |
| MPG4 | MPEG-4 (automatic WMP download) | Microsoft | ZyGo | ZyGoVideo | ZyGo Digital |

Those of skill in the art will recognize that many of the above-described codecs may be deemed "generalist" codecs in that they achieve a high compression quality for a wide variety of media signals and conditions. However, other codecs may be deemed "specialist" codecs because they compress certain types of media signals well or compress many types of media signals well under certain conditions. Providing a codec library 308 that includes a variety of both generalist and specialist codecs, including codecs of different families, typically results in the best overall compression quality for a compressed media signal 210.

Referring again to FIG. 3, after a codec 110 is selected for a scene 206, a compression module 310 compresses the scene 206 using the selected codec 110. An output module 312 receives the resulting compressed media signal 210 and, in one embodiment, adds codec identifiers 208 to indicate which codecs 110 were used to compress each scene 206. In other embodiments, the codec identifiers 208 may be added by the compression module 310 or at other points in the compression process. The output module 312 then delivers the compressed media signal 210 to the destination system 204 via the network 114.

Figure 4:
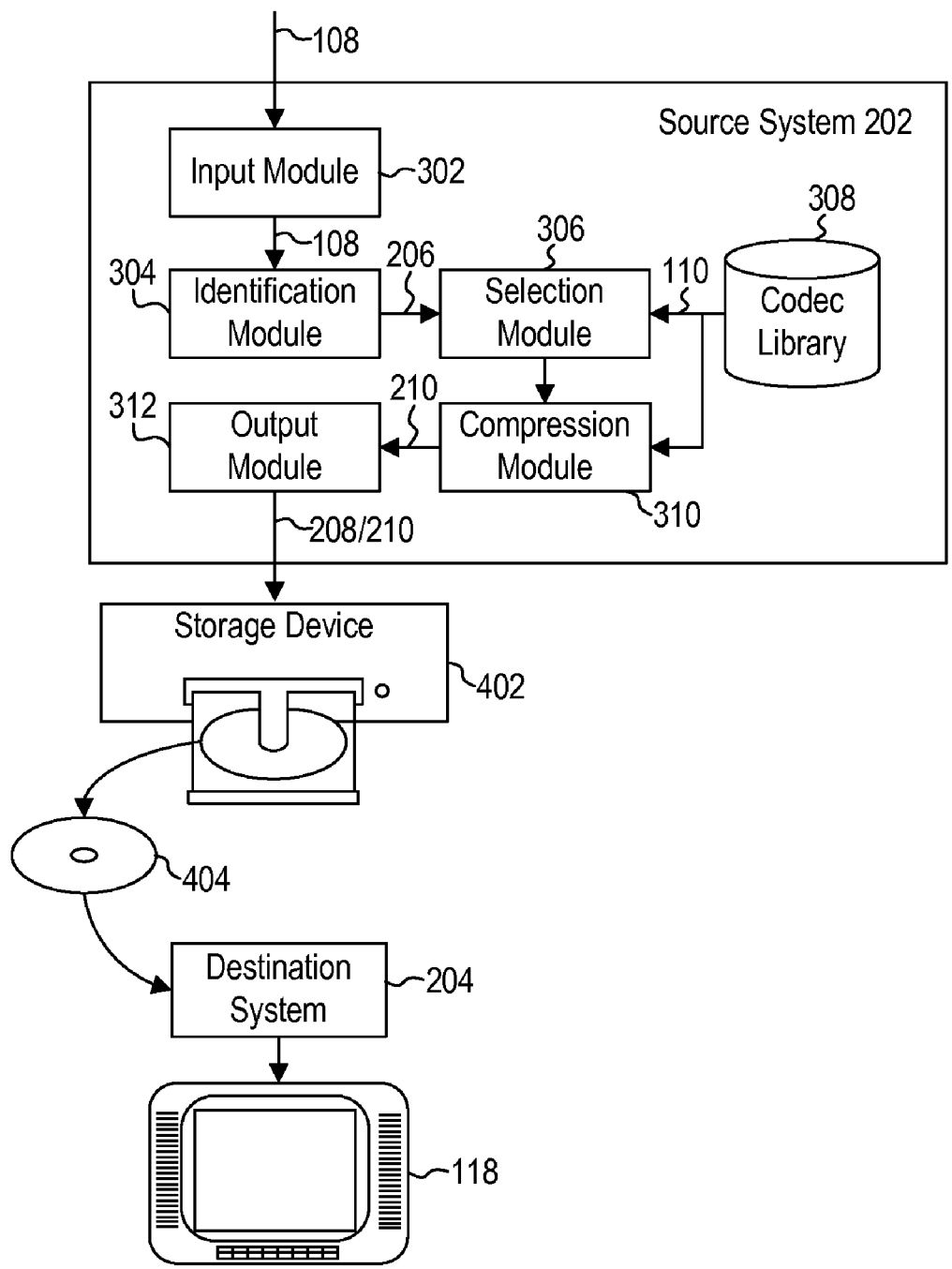
FIG. 4 is a detailed block diagram of a source system according to a second embodiment of the invention.

The embodiment of FIG. 3 is primarily applicable to streaming media applications, including video conferencing. In an alternative embodiment, as depicted in FIG. 4, the output module 312 may be coupled to a storage device 402, such as CD or DVD recorder, flash card writer, or the like. As depicted, the compressed media signal 210 (and codec identifiers 208) may be stored on an appropriate storage medium 404, which is physically delivered to the destination system 204. In such an embodiment, the destination system 204 would include a media reader (not shown) for reading the compressed media signal 210 from the storage medium 404.

Unlike conventional media compression techniques, the original media signal 108 is not compressed using a single codec (i.e., MPEG-2 as in DVDs). Rather, each scene 206 is automatically compressed using the best codec 110 selected from a codec library 308 for that scene 206. Using the above-described technique, between 10 to 12 hours of DVD-quality video may be stored on a single recordable DVD.

Figure 5:
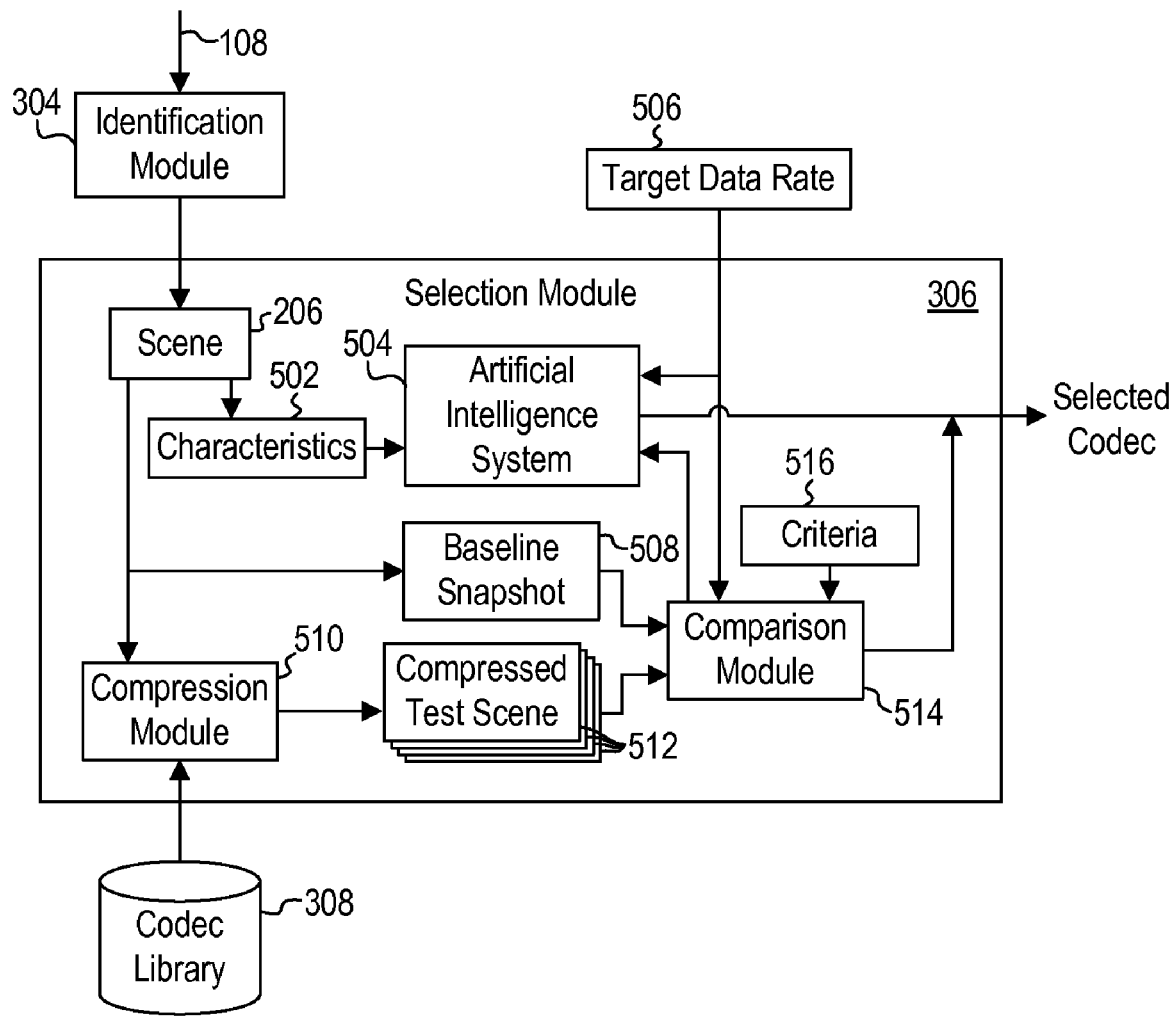
FIG. 5 is a detailed block diagram of a selection module.

FIG. 5 illustrates additional details of the selection module 306. As noted above, the identification module 304 receives the original media signal 108 and identifies individual scenes 206, as well as characteristics 502 of each scene 206. The characteristics 502 may include, for instance, motion characteristics, color characteristics, YUV signal characteristics, color grouping characteristics, color dithering characteristics, color shifting characteristics, lighting characteristics, and contrast characteristics. Those of skill in the art will recognize that a wide variety of other characteristics of a scene 206 may be identified within the scope of the invention.

Motion is composed of vectors resulting from object detection. Relevant motion characteristics may include, for example, the number of objects, the size of the objects, the speed of the objects, and the direction of motion of the objects.

With respect to color, each pixel typically has a range of values for red, green, blue, and intensity. Relevant color characteristics may include how the ranges of values change through the frame set, whether some colors occur more frequently than other colors (selection), whether some color groupings shift within the frame set, whether differences between one grouping and another vary greatly across the frame set (contrast).

In one embodiment, an artificial intelligence (AI) system 504, such as a neural network or expert system, receives the characteristics 502 of the scene 206, as well as a target data rate 506 for the compressed media signal 210. The AI system 504 then determines whether a codec 110 exists in the library 308 that has previously been found to optimally compress a scene 206 with the given characteristics 502 at the target data rate 506. As explained below, the AI system 504 may be conceptualized as "storing" associations between sets of characteristics 502 and optimal codecs 110. If an association is found, the selection module 306 outputs the codec 110 (or an indication thereof) as the "selected" codec 110.

In many cases, a scene 206 having the specified characteristics 502 may not have been previously encountered. Accordingly, the selection module 306 makes a copy of the scene 206, referred to herein as a baseline snapshot 508, which serves as a reference point for determining compression quality.

Thereafter, a compression module 510 tests different codecs 110 from the codec library 308 on the scene 206. In one embodiment, the compression module 510 is also the compression module 310 of FIG. 3. As depicted, the compression module 510 compresses the scene 206 using different codecs 110 at the target data rate 506 to produce multiple compressed test scenes 512.

The codecs 110 may be tested sequentially, at random, or in other ways, and all of the codecs 110 in the library need not be tested. In one embodiment, input from the AI system 504 may assist with selecting a subset of the codecs 110 from the library 308 for testing. In some cases, a time limit may be imposed for codec testing in order to facilitate real-time compression. Thus, when the time limit is reached, no additional compressed test scenes 512 are generated.

In one embodiment, a comparison module 514 compares the compression quality of each compressed test scene 512 with the baseline snapshot 508 according to a set of criteria 516. The criteria 516 may be based on a comparison of Peak Signal to Noise Ratios (PSNRs), which may be calculated, for an M×N frame, by:

$$PSNR = 20 \times \log_{10}\left(\frac{255}{\sqrt{\frac{1}{M \times N} \sum_{m=0}^{M-1} \sum_{n=0}^{N-1} [f'(m, n) - f(m, n)]^2}}\right) \quad \text{Eq. 1}$$

where f is the original frame and f' is the uncompressed frame.

Alternatively, Root Mean Square Error (RMSE), Signal to Noise Ratio (SNR), or other objective quality metrics may be used as known to those of skill in the art.

In certain embodiments, a Just Noticeable Difference (JND) image quality metric calculation may be used. JND is a robust objective picture quality measurement method known to those skilled in the art. It includes three dimensions for evaluation of dynamic and complex motion sequences—spatial analysis, temporal analysis and full color analysis. By using a model of the human visual system in a picture differencing process, JND produces results that are independent of the compression process and resulting artifacts.

In one embodiment, the comparison module 514 automatically selects the codec 110 used to generate the compressed scene 512 that has the highest compression quality when compared to the baseline snapshot 508 according to the set of criteria 516. That codec 110 (or an indication thereof) is then output by the selection module 306 as the selected codec 110.

The comparison module 514 tells the AI system 504 which codec 110 was selected for the scene 206. This allows the AI system 504 to make an association between the identified characteristics 502 of the scene 206 and the selected codec 110. Thus, in the future, the AI system 504 may automatically select the codec 110 for a similar scene 206 without the need for retesting by the comparison module 514.

Referring also to FIG. 3, in one configuration, the highest-quality compressed test scene 512a is simply passed to the output module 312 (not shown) to be included in the compressed media signal 210. However, the compression module 310 could recompress the scene 206 using the selected codec 110 in certain embodiments.

Figure 6:
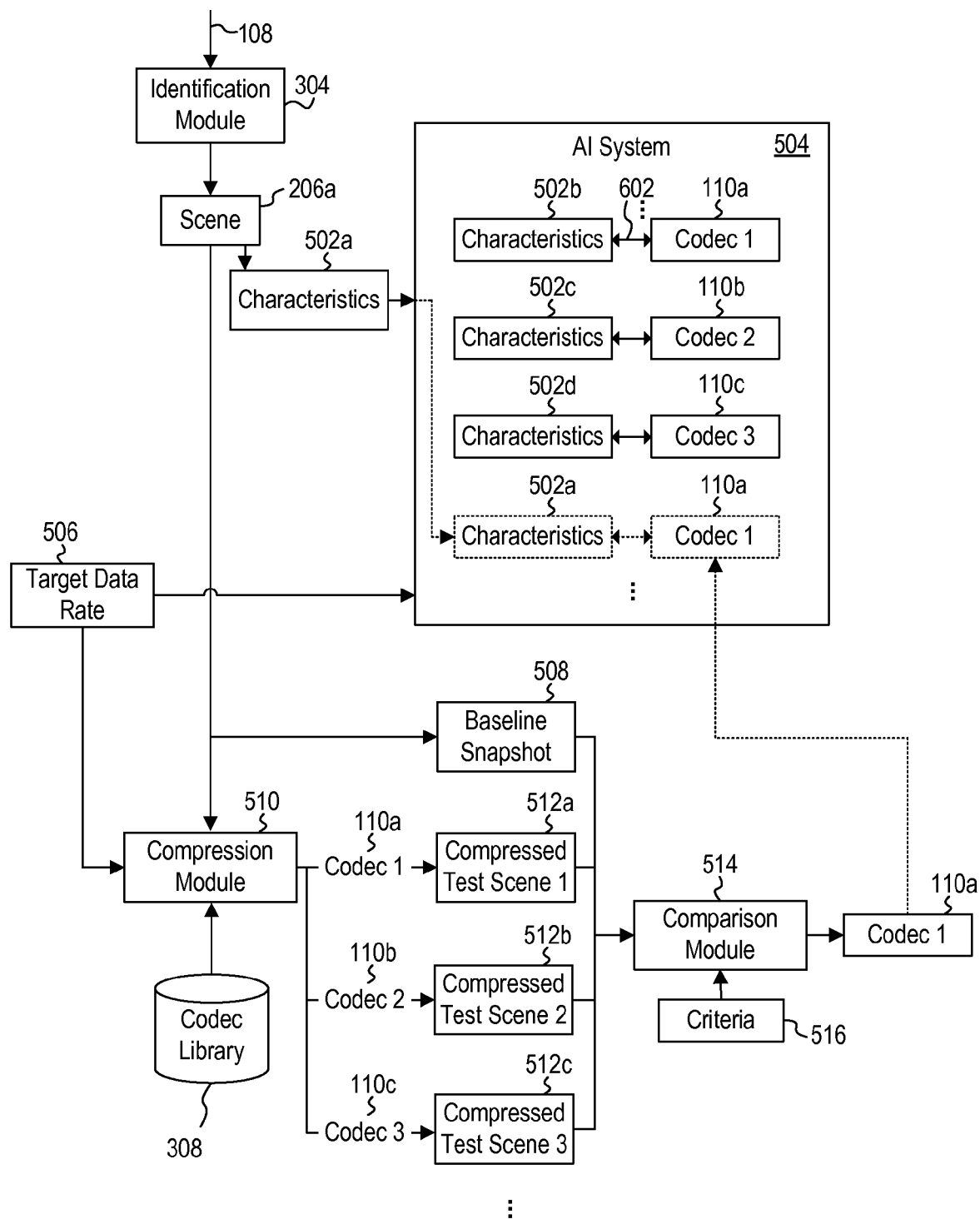
FIG. 6 is a data flow diagram of a process for automatically selecting a codec.

FIG. 6 provides an example of the above-described process. Suppose that the identification module 304 finds a scene 206a having a particular set of characteristics 502a. In one embodiment, the AI system 504 searches an association 602 between the characteristics 502a and a particular codec 110. While the AI system 504 is depicted as including characteristics 502, associations 602, and codecs 110, those skilled in the art will recognize that these entities may be represented by codes, hashes, or other identifiers in various implementations.

Assuming that no such association 602 is found, a baseline snapshot 508 of the scene 206a is taken. In addition, the compression module 510 compresses the scene 206a at the target data rate 506 using a number of different codecs 110a-c from the codec library 308 to create a plurality of compressed test scenes 512a-c. These test scenes 512a-c are then compared against the baseline snapshot 508 according to a set of criteria 516, e.g., PSNR.

Suppose that the compressed test scene 512a produced by one codec 110a ("Codec 1") results in the highest compression quality, e.g., the highest PSNR. In such a case, the comparison module 514 would inform the AI system 504 so that an association 602 could be made between the characteristics 502a of the scene 206a and the selected codec 110a. Thus, if a scene 206 having the same characteristics 502a is encountered in the future, the AI system 504 could simply identify the optimal codec 110a without the need for retesting.

Figure 7:
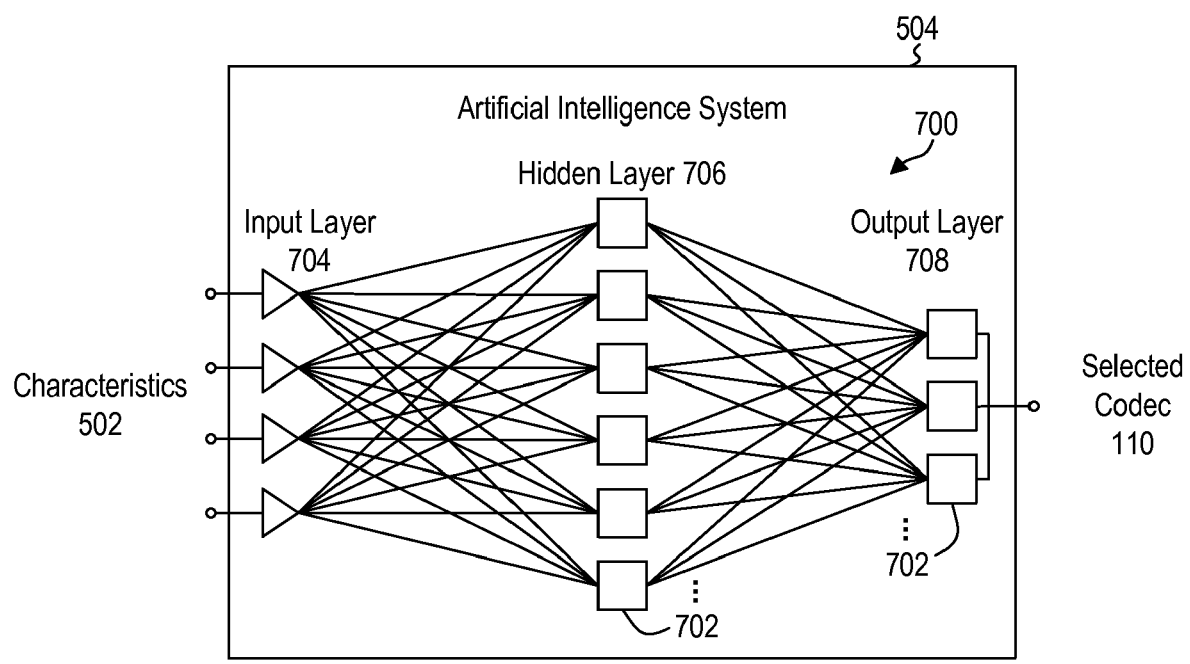
FIG. 7 is a detailed block diagram of an artificial intelligence system.

Referring to FIG. 7, the AI system 504 may be implemented using a typical feedforward neural network 700 comprising a plurality of artificial neurons 702. A neuron 702 receives a number of inputs (either from original data, or from the output of other neurons in the neural network 700). Each input comes via a connection that has a strength (or "weight"); these weights correspond to synaptic efficacy in a biological neuron. Each neuron 702 also has a single threshold value. The weighted sum of the inputs is formed, and the threshold subtracted, to compose the "activation" of the neuron 702 (also known as the post-synaptic potential, or PSP, of the neuron 702). The activation signal is passed through an activation function (also known as a transfer function) to produce the output of the neuron 702.

As illustrated, a typical neural network 700 has neurons 702 arranged in a distinct layered topology. The "input" layer 704 is not composed of neurons 702, per se. These units simply serve to introduce the values of the input variables (i.e., the scene characteristics 502). Neurons 702 in the hidden 706 and output 708 layers are each connected to all of the units in the preceding layer.

When the network 700 is executed, the input variable values are placed in the input units, and then the hidden and output layer units are progressively executed. Each of them calculates its activation value by taking the weighted sum of the outputs of the units in the preceding layer, and subtracting the threshold. The activation value is passed through the activation function to produce the output of the neuron 702. When the entire neural network 700 has been executed, the outputs of the output layer 708 act as the output of the entire network 700 (i.e., the selected codec 110).

While a feedforward neural network 700 is depicted in FIG. 7, those of skill in the art will recognize that other types of neural networks 700 may be used, such as feedback networks, Back-Propagated Delta Rule Networks (BP) and Radial Basis Function Networks (RBF). In other embodiments, an entirely different type of AI system 504 may be used, such as an expert system.

In still other embodiments, the AI system 504 may be replaced by lookup tables, databases, or other data structures that are capable of searching for a codec 110 based on a specified set of characteristics 502. Thus, the invention should not be construed as requiring an AI system 504.

Figure 8:
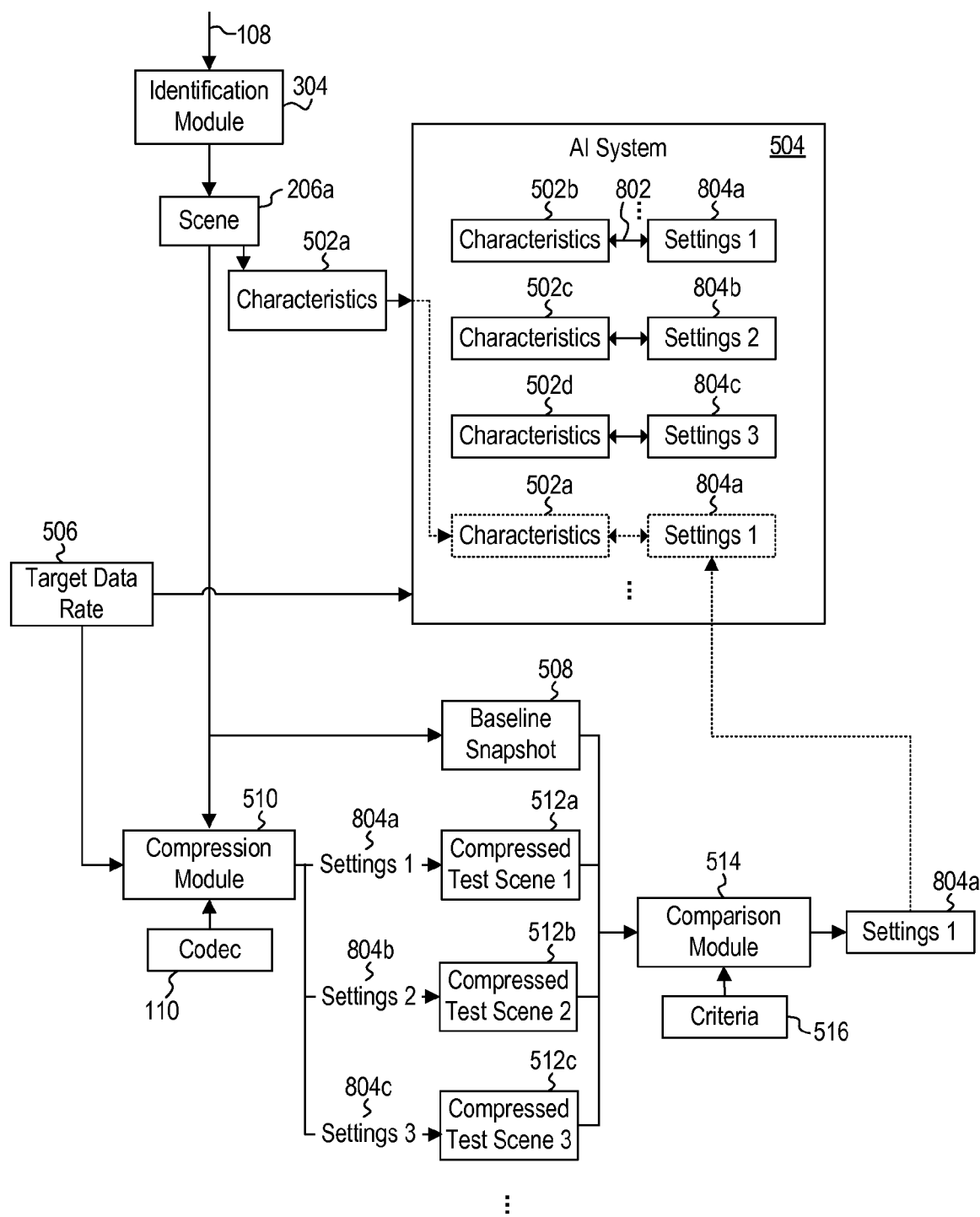
FIG. 8 is a data flow diagram of a process for automatically selecting settings for a codec.

Referring to FIG. 8, the invention is not limited to embodiments in which different codecs 110 are used to respectively encode different scenes 206 of an original media signal 108. As illustrated, a single codec 110 may be used in one embodiment. However, different settings 804 (parameters) for the codec 110 may be automatically selected in much the same way that different codecs 110 were selected in the preceding embodiments.

As used herein, codec settings 804 refer to standard parameters such as the motion estimation method, the GOP size (keyframe interval), types of transforms (e.g., DCT vs. wavelet), noise reduction for luminance or chrominance, decoder deblocking level, preprocessing/postprocessing filters (such as sharpening and denoising), etc.

As before, suppose that the identification module 304 finds a scene 206a having a given set of characteristics 502a. In one embodiment, the AI system 504 searches an association 802 between the characteristics 502a and one or more settings 804a for the codec 110.

Assume that no such association 802 is found. In one configuration, a baseline snapshot 508 of the scene 206a is taken. In addition, the compression module 510 compresses the scene 206a at the target data rate 506 using the same codec 110 but with different settings 804a-c. The resulting compressed test scenes 512a-c are then compared against the baseline snapshot 508 according to a set of criteria 516, e.g., PSNR.

Suppose that the compressed test scene 512a produced by one group of settings 804a ("Settings 1") results in the highest compression quality, e.g., the highest PSNR. In such a case, the comparison module 514 would inform the AI system 504, so that an association 802 could be made between the characteristics 502a of the scene 206a and the selected group of settings 804a. Accordingly, if a scene 206 having the same characteristics 502a is encountered in the future, the AI system 504 could simply identify the optimal settings 804a without the need for retesting.

In still other embodiments, the AI system 504 may search for both different codecs 110 and different codec settings 804 based on a given set of characteristics 502. Likewise, the compression module 510 may generate compressed test scenes 512 based on combinations of different codecs 110 and different settings 804. The comparison module 514 may then select the best combination of codec 110 and settings 804 for a given scene 206.

Figure 9:
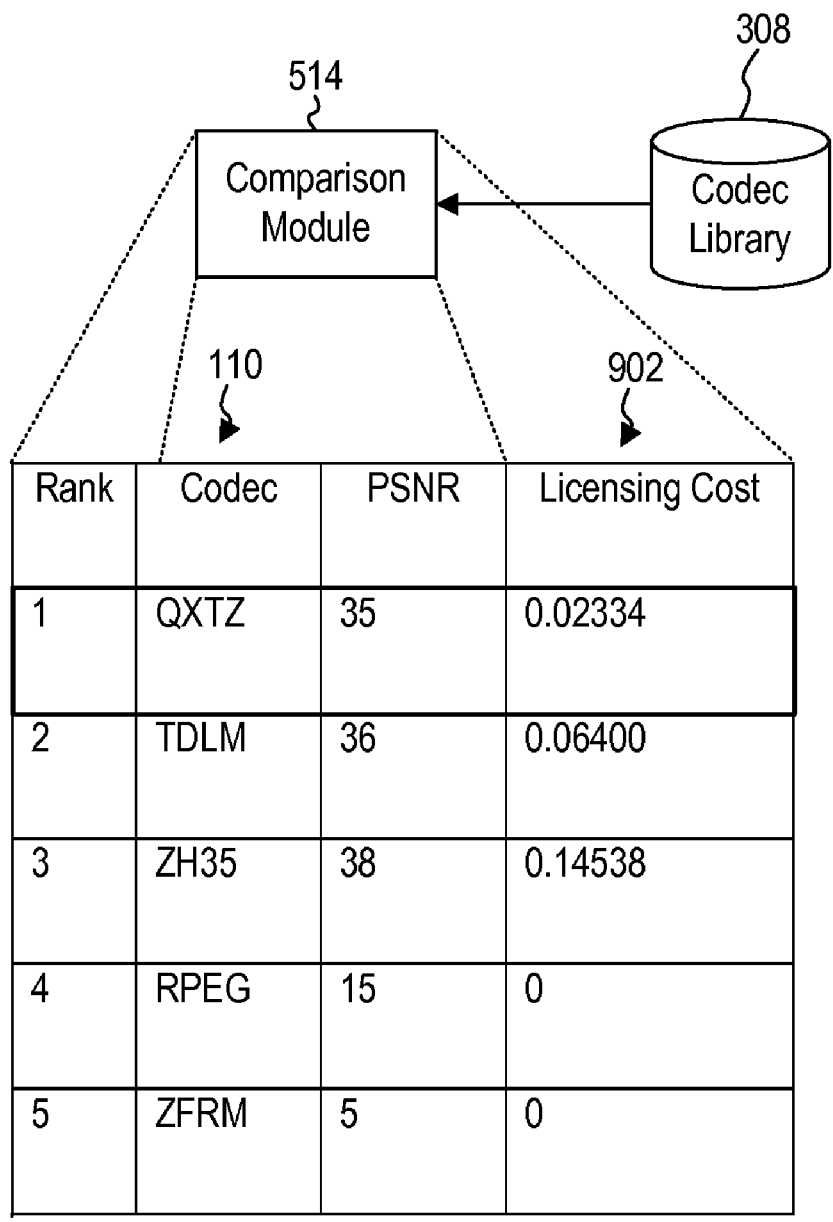
FIG. 9 is a block diagram of a comparison module showing the introduction of a licensing cost factor.

In one embodiment, as shown in FIG. 9, the comparison module 514 may consider other factors in addition to (or in lieu of) compression quality in determining which codec 110 and/or settings 804 to automatically select for a particular scene 206. For instance, the use of certain codecs 110 may incur licensing costs 902 based on patents or other intellectual property rights. The licensing costs 902 may be tied to the number of times the codec 110 is used, the amount of data compressed using the codec 110, or in other ways.

While one codec 110 may provide an exceptionally high compression quality (e.g., PSNR), its licensing cost 902 may exceed the value of the transmission and would not be cost justified. Indications of the licensing costs 902 for various codecs 110 may be stored within the codec library 308 or at other locations accessible by the comparison module 514.

In one embodiment, the licensing costs 902 are considered only when a number of the top codecs 110 produce similar results, e.g., the compression qualities differ by no more than a threshold amount. In the example of FIG. 9, the first three codecs 110 produce output of similar quality. However, the codec 110 with the highest PSNR score is more than two times more expensive than the codec 110 with the next highest PSNR score, which is, itself, almost three times more expensive than the codec 110 with the third highest PSNR score. In one configuration, the comparison module 510 would select the codec 110 with the third highest PSNR score due to its much lower licensing cost 902.

In other embodiments, the comparison module 514 may create a composite score (not shown) based on the PSNR score, the licensing cost 902, and other possible factors. In still other embodiments, the comparison module 514 may calculate an anticipated cost (not shown) for the entire transmission and seek to minimize that cost over all of the codec selection decisions. Hence, the comparison module 514 might select a more expensive codec 110 for certain scenes 206, where a substantial increase in quality is realized, while selecting less expensive codecs 110 for other scenes.

Figure 10:
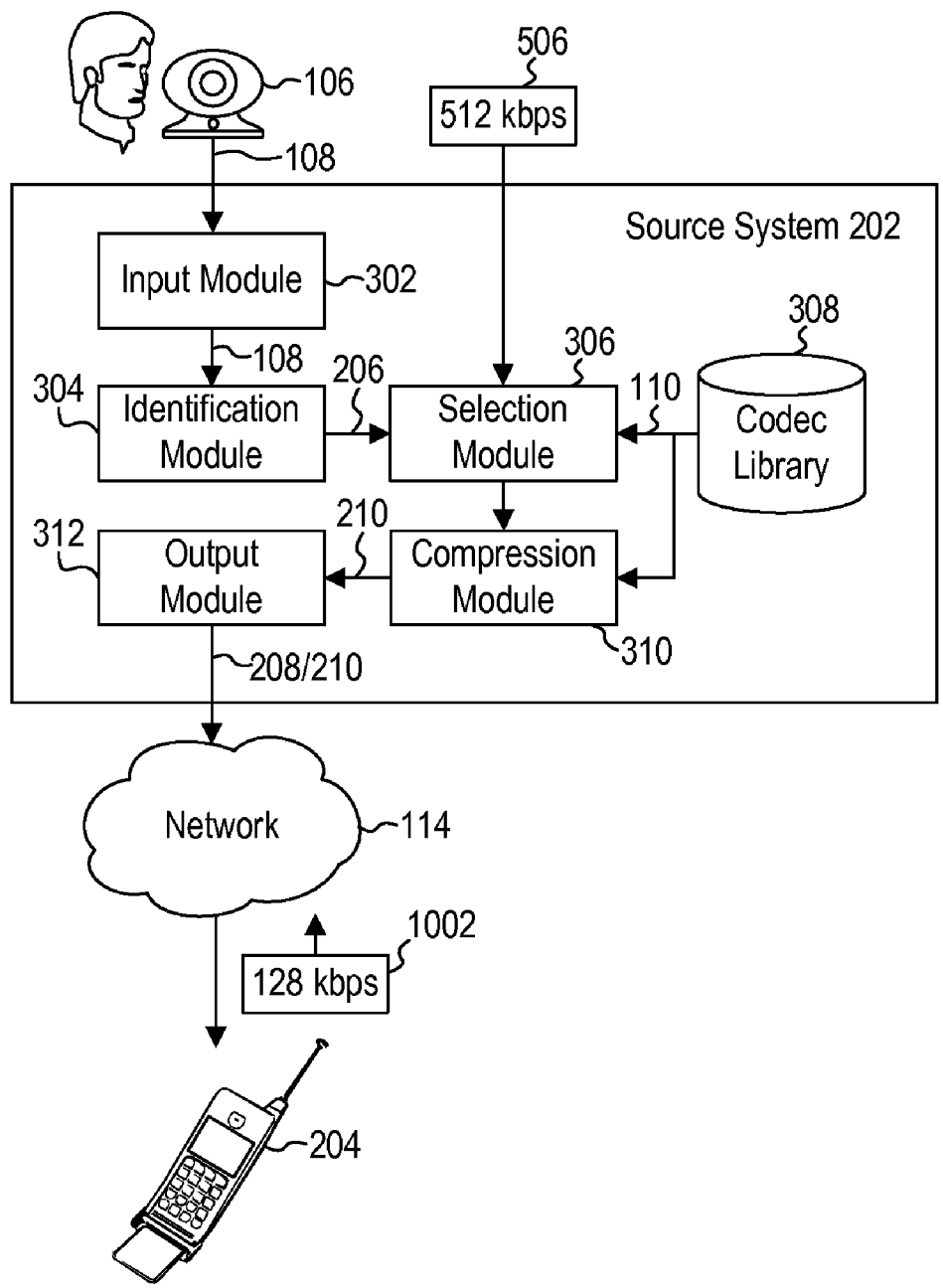
FIG. 10 is a block diagram of a process for modifying a target data rate.

Referring to FIG. 10, a user of the source system 202 may specify a particular target data rate 506, e.g., 512 kbps, for video communication. However, there is no guarantee that the destination system 204 may be able to process data that quickly. Moreover, there is no guarantee that the network 114 will always provide the same amount of bandwidth. As a result, there may be a need to periodically change the target data rate 506 within the selection module 306 of the source system 202, since the target data rate 506 will affect which codecs 110 are selected for various scenes 206.

For example, as shown in FIG. 10, the destination system 204 may be embodied as a video-enabled cellular telephone. Typically, the bandwidth over cellular networks 114 is limited. Similarly, the processing power of a cellular telephone is substantially less than that of a personal computer or dedicated video conferencing system.

Thus, although the user of the source system 202 specifies a target data rate 506 of 512 kbps, the destination system 204 and/or network 114 may not be up to the challenge. In one embodiment, in response to receiving a connection request, the destination system 204 provides the source system 202 with a modified target data rate 1002, e.g., 128 kpbs. The modified rate 1002 may be communicated to the source system 202 using any standard data structure or technique. Thereafter, depending on the configuration, the target data rate 506 may be replaced by the modified rate 1002.

In certain embodiments, an actual data rate is not communicated. Rather, a message is sent specifying one or more constraints or capabilities of the destination system 204 or network 114, in which case it would be up to the source system 202 to revise the target data rate 506 as appropriate. A technique of altering the target data rate 506 in response to various conditions is referred to herein as "dynamic streaming".

In one embodiment, dynamic streaming may be employed where no specific message is sent by destination system 204. The source system 202 may use latency calculations, requests to resend lost packets, etc., to dynamically determine the target data rate 506 for purposes of codec and/or parameter selection.

Figure 11:
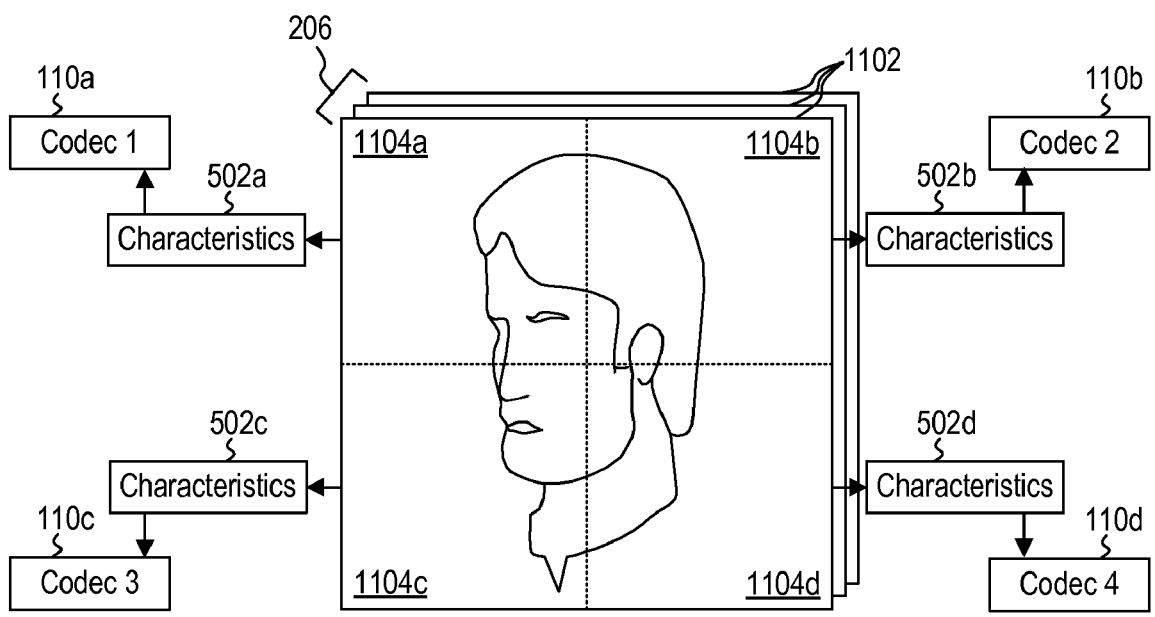
FIG. 11 shows a video frame subdivided into a plurality of sub-frames.

In one configuration, as shown in FIG. 11, video frames 1102 within a scene 206 may be subdivided into a plurality of sub-frames 1104. While the depicted video frame 1102 is subdivided into four sub-frames 1104a-d of equal size, the invention is not limited in this respect. For instance, a video frame 1102 may be subdivided into any number of sub-frames 1104, although too many sub-frames 1104 may adversely affect compression quality. Moreover, the sub-frames 1104 need not be of equal size. For example, sub-frames 1104 near the center of the video frame 1102 may be smaller due to the relatively greater amount of motion in this area.

In certain embodiments, the sub-frames 1104 may be defined by objects represented within the video frame 1102. As an example, the head of a person could be defined as a separate object and, hence, a different sub-frame 104 from the background. Algorithms (e.g., MPEG-4) for objectifying a scene within a video frame 1102 are known in the art.

A set of sub-frames 1104a-d within a scene 206 exhibit characteristics 502a-d, and may be treated, for practical purposes, like a complete video frame 1102. Accordingly, using the techniques described above, the characteristics 502a-d may be used to determine an optimal codec 1104a-d for the compressing the respective sub-frames 1104a-d. For example, an AI system 504 (not shown) may be used to determine whether an association 602 exists between a set of characteristics 502 and a particular codec 110. If no association 602 exists, compression 510 and comparison 514 modules (not shown) may be used to test a plurality of codecs 110 on the respective sub-frames 1104 to determine the optimal codec 110.

Thus, different sub-frames 1104a-d of a single scene 206 may be compressed using different codecs 110a-d. In the illustrated embodiment, four different codecs 110a-d are used.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A media compression method comprising:
    obtaining a media signal to be communicated to a destination system;
    identifying a plurality of scenes within the media signal;
    automatically selecting different codecs from a codec library to respectively compress at least two of the scenes, wherein the codecs are automatically selected to produce a highest compression quality for the respective scenes according to a set of criteria without exceeding a target data rate;
    compressing the scenes using the automatically selected codecs; and
    delivering the compressed scenes to the destination system with an indication of which codec was used to compress each scene.

2. The method of claim 1, wherein the codecs are selected from the group consisting of discrete cosine transform (DCT) codecs, fractal codecs, and wavelet codecs.

3. The method of claim 1, wherein automatically selecting further comprises:
    identifying a plurality of characteristics of a scene; and
    searching for a codec in the library that is associated with the identified characteristics of the scene.

4. The method of claim 3, wherein the characteristics are selected from the group consisting of motion characteristics and color characteristics.

5. The method of claim 4, wherein searching further comprises using an Artificial Intelligence (AI) system to locate a codec associated with the identified characteristics of a scene.

6. The method of claim 3, wherein searching further comprises searching for an association between the identified characteristics and a set of parameters to be used with the automatically selected codec;
    wherein compressing further comprises compressing the scene using the automatically selected codec with the associated set of parameters; and
    wherein delivering further comprises delivering the compressed scene to the destination system with an indication of which codec and which set of parameters were used to compress the scene.

7. The method of claim 1, wherein automatically selecting comprises:
    testing at least a subset of the codecs of the codec library on a scene; and
    automatically selected the codec that produces a highest compression quality for the scene according to a set of criteria without exceeding the target data rate.

8. The method of claim 7, wherein testing further comprises testing codecs of the codec library on the scene using different sets of parameters and automatically selecting the codec and set of parameters that produce a highest compression quality for the scene according to a set of criteria without exceeding the target data rate;
    wherein compressing further comprises compressing the scene using the automatically selected codec with the automatically selected parameters; and
    wherein delivering further comprises delivering the compressed scene to the destination system with an indication of which codec and set of parameters were used to compress the scene.

9. The method of claim 8, further comprising:
    identifying a plurality of characteristics of a scene; and
    associating the automatically selected codec and the automatically selected set of parameters with the identified characteristics of the scene.

10. The method of claim 1, wherein automatically testing further comprises:
    storing a baseline snapshot of the scene; and
    for each codec to be tested:
        compressing the scene at or below the target data rate using one of the codecs in the library;
        decompressing the scene using the same codec; and
        comparing the quality of the decompressed scene with the baseline snapshot according to the set of criteria.

11. The method of claim 10, wherein comparing further comprises comparing the quality according to a Peak Signal to Noise Ratio (PSNR).

12. The method of claim 10, wherein comparing further comprises comparing the quality according to a Just Noticeable Difference (JND) value.

13. The method of claim 1, further comprising:
    identifying a plurality of characteristics of a scene; and
    associating the identified characteristics of the scene with the automatically selected codec.

14. The method of claim 1, further comprising adjusting the target data rate in response to constraints of the destination system.

15. The method of claim 1, further comprising adjusting the target data rate in response to conditions of a transmission channel to the destination system.

16. The method of claim 1, further comprising adjusting the target data rate in response to a message from the destination system.

17. The method of claim 1, wherein identifying further comprises detecting a scene change in response to one frame of the media signal being sufficiently different from a previous frame.

18. The method of claim 1, wherein delivering comprises one of streaming each compressed scene to the destination system through a network or storing each compressed scene on a storage medium.

\* \* \* \* \*